Feb. 4, 1947. G. F. DALY ET AL 2,415,279
RECORD CARD FEEDING MECHANISM
Filed July 16, 1943 13 Sheets-Sheet 2

Feb. 4, 1947.　　　　G. F. DALY ET AL　　　　2,415,279
RECORD CARD FEEDING MECHANISM
Filed July 16, 1943　　　13 Sheets-Sheet 9

INVENTORS
BY
ATTORNEY

FIG. 14.

| CYCLES | 1 | 2 | 3 | 4 | 5 | 6 | 7 |
|---|---|---|---|---|---|---|---|
| CARD 1 (SIMPLEX) | PICK CARD | CARD ADVANCES TO C | D ZONES DECK U / C ZONES DECK L | B LISTS DECK U / A LISTS DECK L | TO STACKER | | |
| CARD 2 (SIMPLEX) | | PICK CARD | CARD ADVANCES TO C | D ZONES DECK U / C ZONES DECK L | B LISTS DECK U / A LISTS DECK L | TO STACKER | |
| CARD 3 (DUPLEX) | | | PICK CARD | D ZONES DECK U / C ZONES DECK L | C ZONES DECK L / C₀ READS ⓞ HOLE | B ZONES DECK U / A LISTS DECK L | A LISTS DECK U (SLOW DRIVE) |
| CARD 4 (SIMPLEX) | | | | CARD ADVANCES TO C | CARD ADVANCES TO C | L PASSES C / U PASSES D | C ZONES DECK U / B ZONES DECK L |
| CARD 5 (DUPLEX) | | | | | PICK CARD | CARD ADVANCES TO D | CARD ADVANCES TO C |
| CARD 6 (DUPLEX) | | | | | | PICK CARD | |
| CARD 7 (SIMPLEX) | | | | | | | PICK CARD |

Patented Feb. 4, 1947

2,415,279

UNITED STATES PATENT OFFICE 2,415,279

RECORD CARD FEEDING MECHANISM

George F. Daly, Endicott, and Clair D. Lake, Binghamton, N. Y., assignors to International Business Machines Corporation, New York, N. Y., a corporation of New York Application July 16, 1943, Serial No. 494,930

6 Claims. (Cl. 101—93)

This invention relates to printing mechanism and more particularly to printing mechanism controlled by perforated record cards.

A particular object of the invention is to provide a novel card feeding and sensing mechanism for such machine for the handling of so-called "double deck" cards in different selective manners to control the printing mechanism from data in both decks of the card concurrently or from both decks in successive order.

A specific object of the invention is to provide a card feeding mechanism in which cards are normally advanced in succession, each passing a fixed point during one cycle of operation and in which, under control of a designation in a card, the rate of feeding is automatically changed, so that the cards each pass the fixed point in two cycles of operation.

Two types of cards are employed in controlling the machine, both being double deck cards classified as simplex and duplex cards. Simplex cards are those in which both decks are to concurrently control the printing mechanism, and duplex cards are those in which the two decks are to control the printing mechanism in succession. The two types are distinguished by the presence of a special designation in a predetermined position on the duplex cards.

Multiple card sensing devices are provided by which a plurality of successive cards are concurrently sensed so that, where there is a promiscuous succession of simplex and duplex cards, one type may be passing one sensing device while another type is passing another sensing device. Provision is accordingly made so that, whether the feeding mechanism is operating at high or low speed, the data on both decks of any simplex card will be read during a single cycle and the decks of a duplex card will be read, one deck in each of two successive cycles.

Other objects of the invention will be pointed out in the following description and claims and illustrated in the accompanying drawings, which disclose, by way of example, the principle of the invention and the best mode, which has been contemplated, of applying that principle.

Figure 14A:
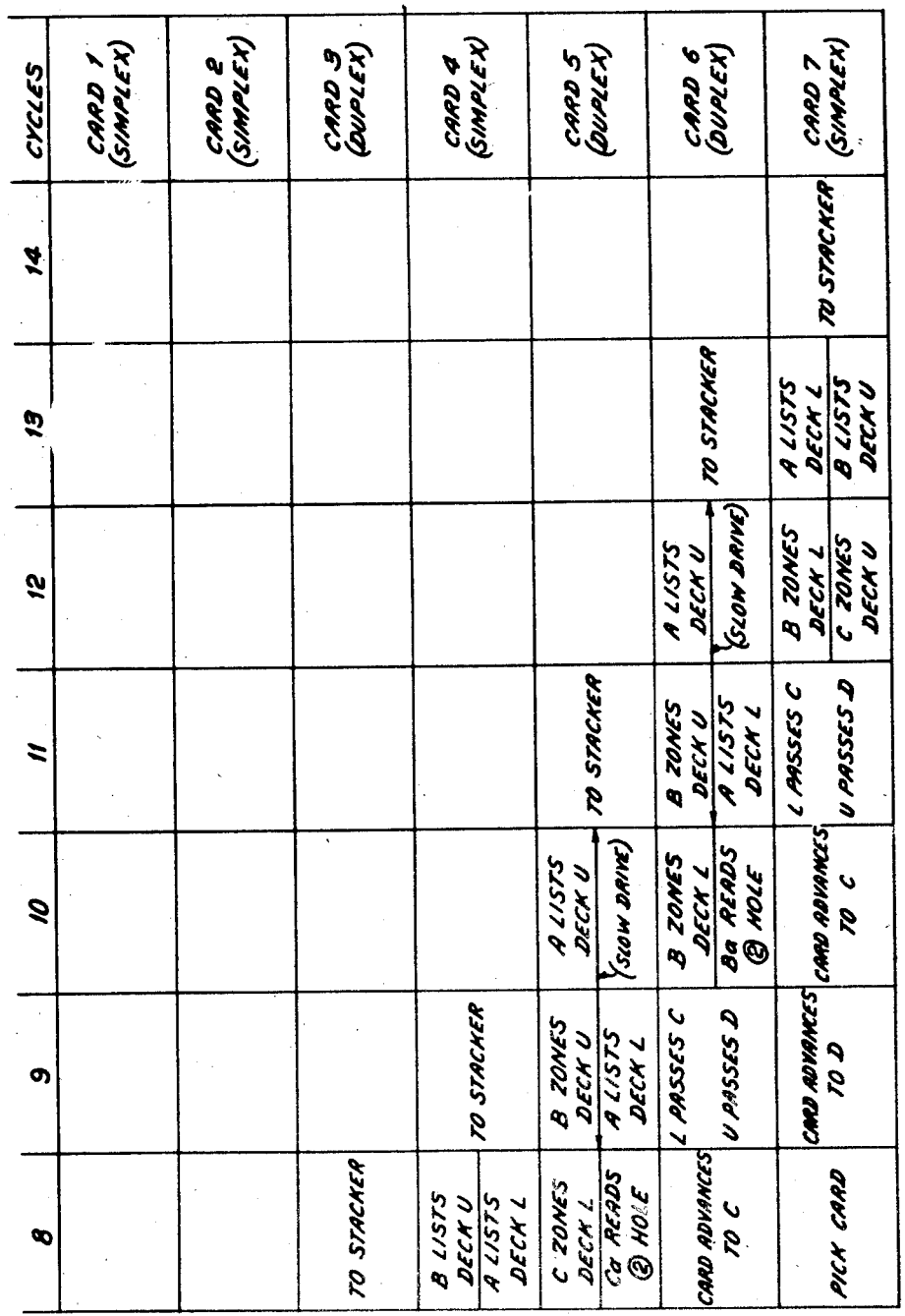

Figs. 14 and 14a taken together form a sequence chart of the operations occurring in successive cycles for a series of cards.

The record cards

Figure 11:
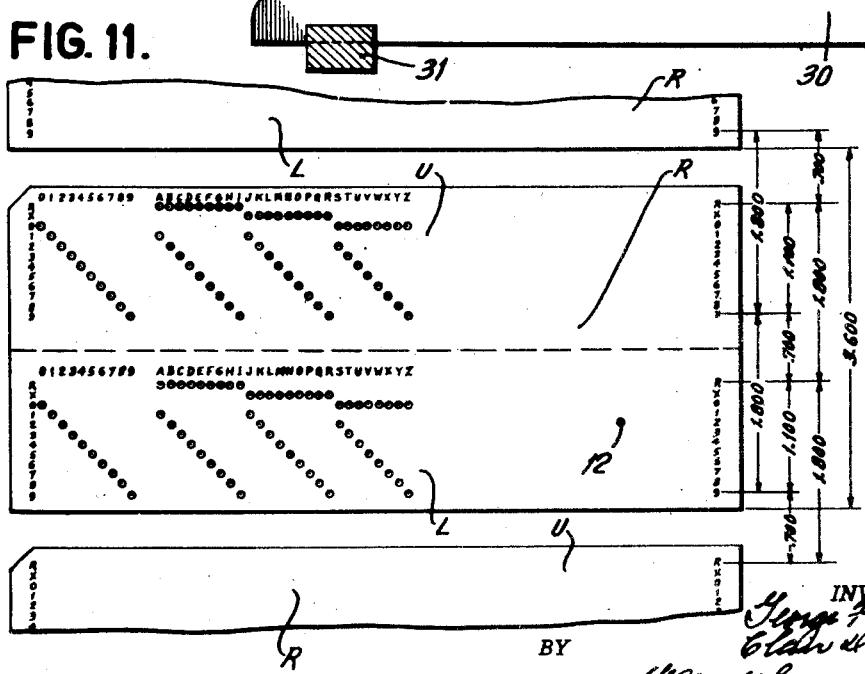
Fig. 11 is a view of a card showing the space relationship between the data receiving positions of successive decks.

An explanation will first be given of the record cards utilized to control the operation of the machine. Referring to Fig. 11, R represents a double deck card having an upper deck designated U and a lower deck designated L. In each deck are provided twelve horizontal rows of perforating or marking positions and a greater number of vertical columns whose points of intersection with the horizontal rows constitute what are known as "index point positions" identified in each column as the 9, 8, 7, 6, 5, 4, 3, 2, 1, 0, X and R positions. Single perforations made in any digital index point position of a column in either deck represents an entry therein of a digit corresponding in value to the digital designation of that point. Thus, the digits 0 to 9 are represented as shown at the left of the card R in Fig. 11.

Alphabetic characters are represented as shown by two-hole code perforations, of which for each character one hole occurs in a digital position 1 to 9 and the second occurs in one of the three positions 0, X or R which are known as zone positions.

In Fig. 11 there are represented three cards R in the space relationship in which they are fed through the sensing mechanism of the machine, and it is significant to note that any horizontal position in a deck is spaced the same distance (1.800) from the like horizontal position of both the preceding and succeeding decks, whether the deck be that of the same or a different card. To distinguish a simplex from a duplex card, a special perforation 12 is made in the 2 index point position of the lower deck L of the duplex card, and such hole is omitted in the simplex card.

Card feeding and sensing mechanism

The mechanism for handling the cards R will now be explained with reference to Figs. 3 to 10, wherein 13 (Fig. 4) represents the hopper in which the cards R are placed and from which they are advanced singly by a picker 14 to a pair of feed rolls 15. From here the cards pass over four conductive rollers 16 to the stacker drum generally designated 17 which receives and deposits the cards in a discharge hopper 18.

Above each contact roller 16 is a line of brushes designated D, C, B or A which make contact through the holes in the cards. The brushes in each line are insulated from one another and their specific construction is set forth in detail in copending application Serial No. 424,168, filed December 23, 1941.

The horizontal spacing of the lines of brushes corresponds to that between like index point positions in successive card decks in Fig. 11, namely, the dimension 1.800, so that when, for example, the 9 index point position of one deck is at brush A, the 9 index point position of the next deck is at brush B, the 9 index point position of the next deck is at brush C, and the 9 index point position of the fourth deck is at brush D. Likewise, for the other index point positions, and it is to be noted that this is true whether the index point position at brush A is in the upper or lower deck of a card.

Figure 3:
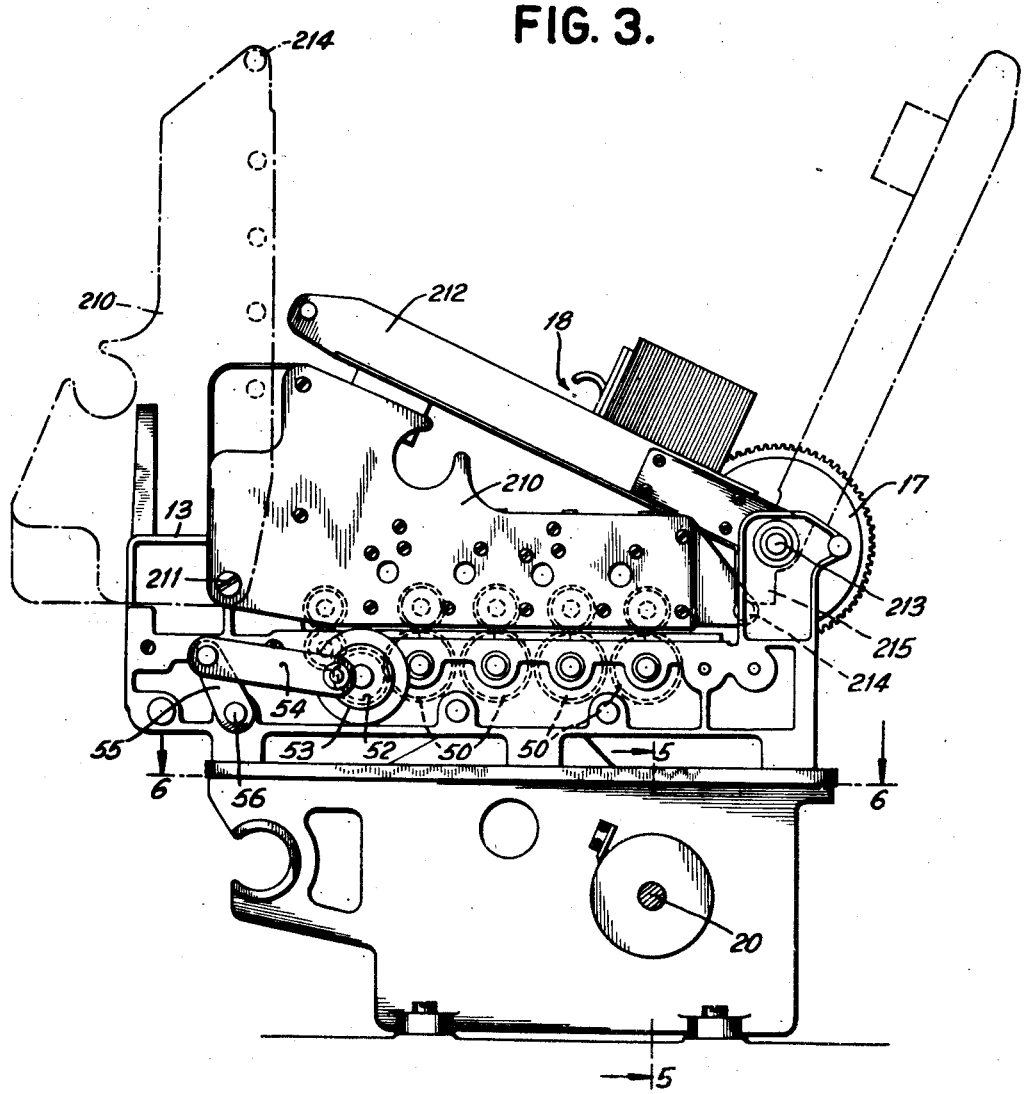
Fig. 3 is an outside view of the card feeding mechanism.
Figure 5:
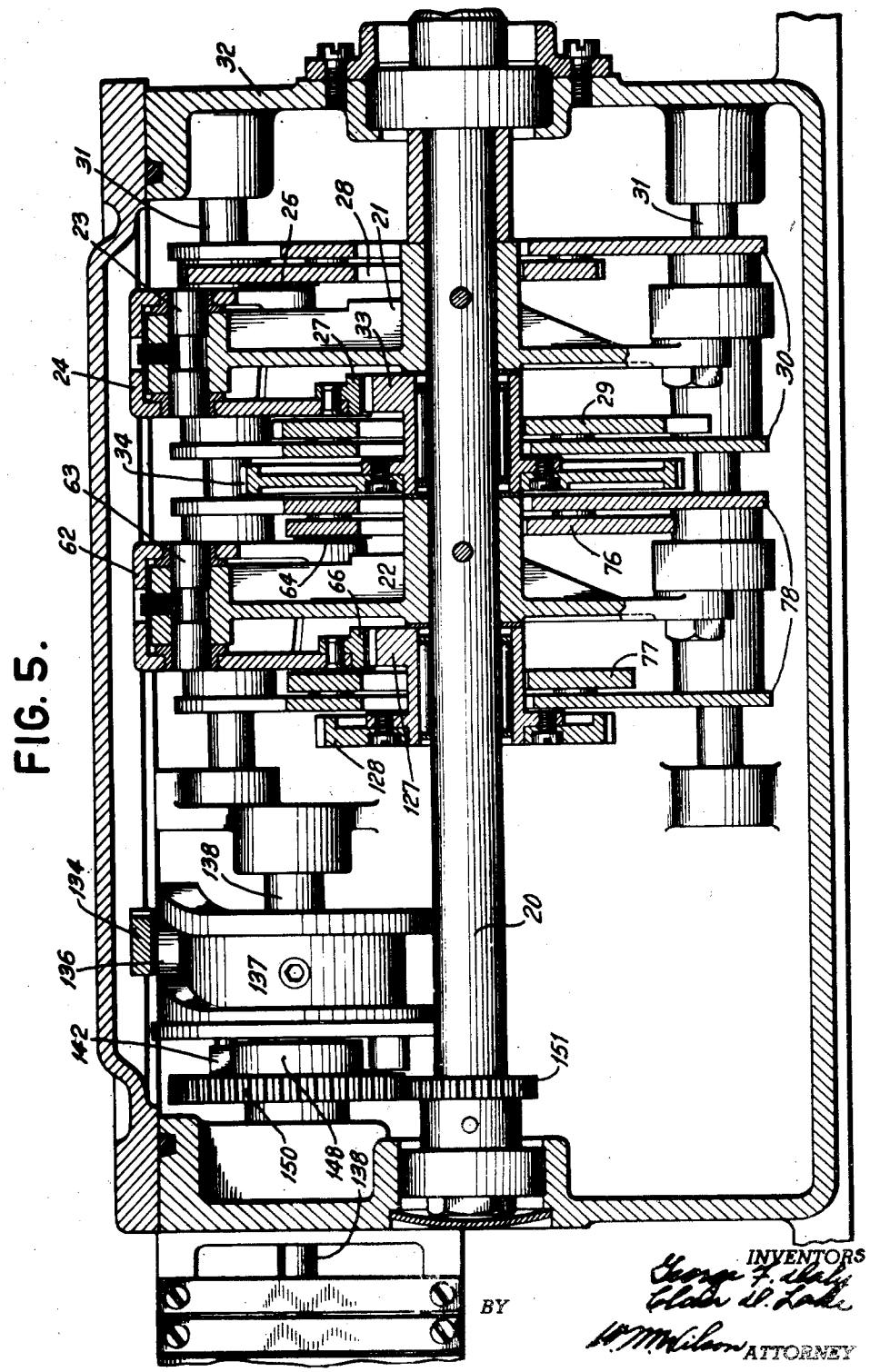
Fig. 5 is a section taken along lines 5—5 of Fig. 3.
Figure 6:
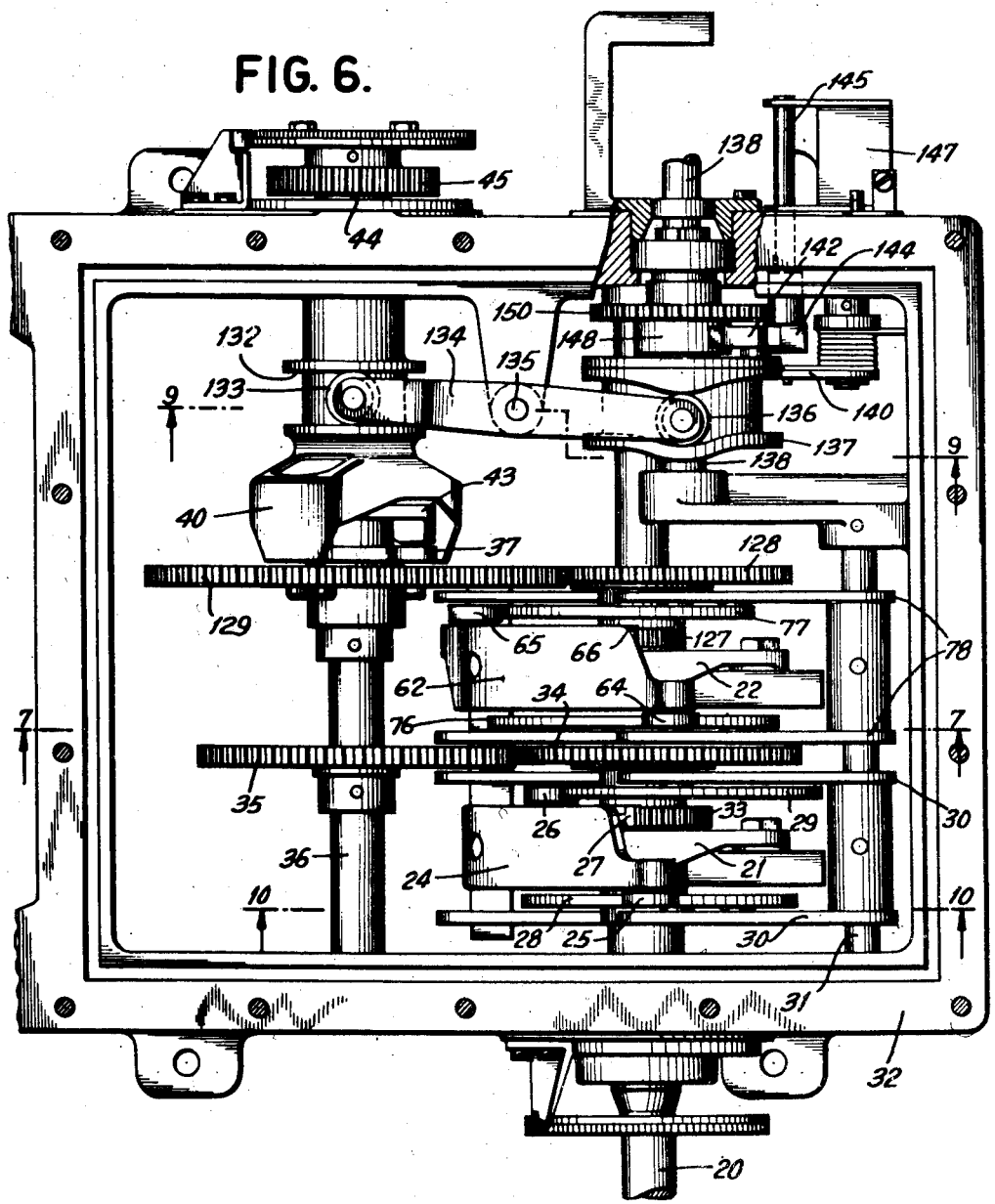
Fig. 6 is a section taken along lines 6—6 of Fig. 3.

Referring now to Figs. 3 and 5, reference numeral 20 represents a shaft which is driven by any suitable means and constitutes the main drive shaft of the feeding mechanism. Through the connections now to be described, one complete revolution of this shaft will normally feed the cards an amount measured by the distance between brushes D and B or C and A, or in terms of card spacing the dimension 3.600 indicated in Fig. 11. This is the so-called "normal drive" which is altered under control of the special hole 12 in a duplex card, so that for each revolution of shaft 20 the distance traveled by the cards is halved, or in other words two revolutions of shaft 20 are required to advance the cards the normal distance 3.600.

Figure 7:
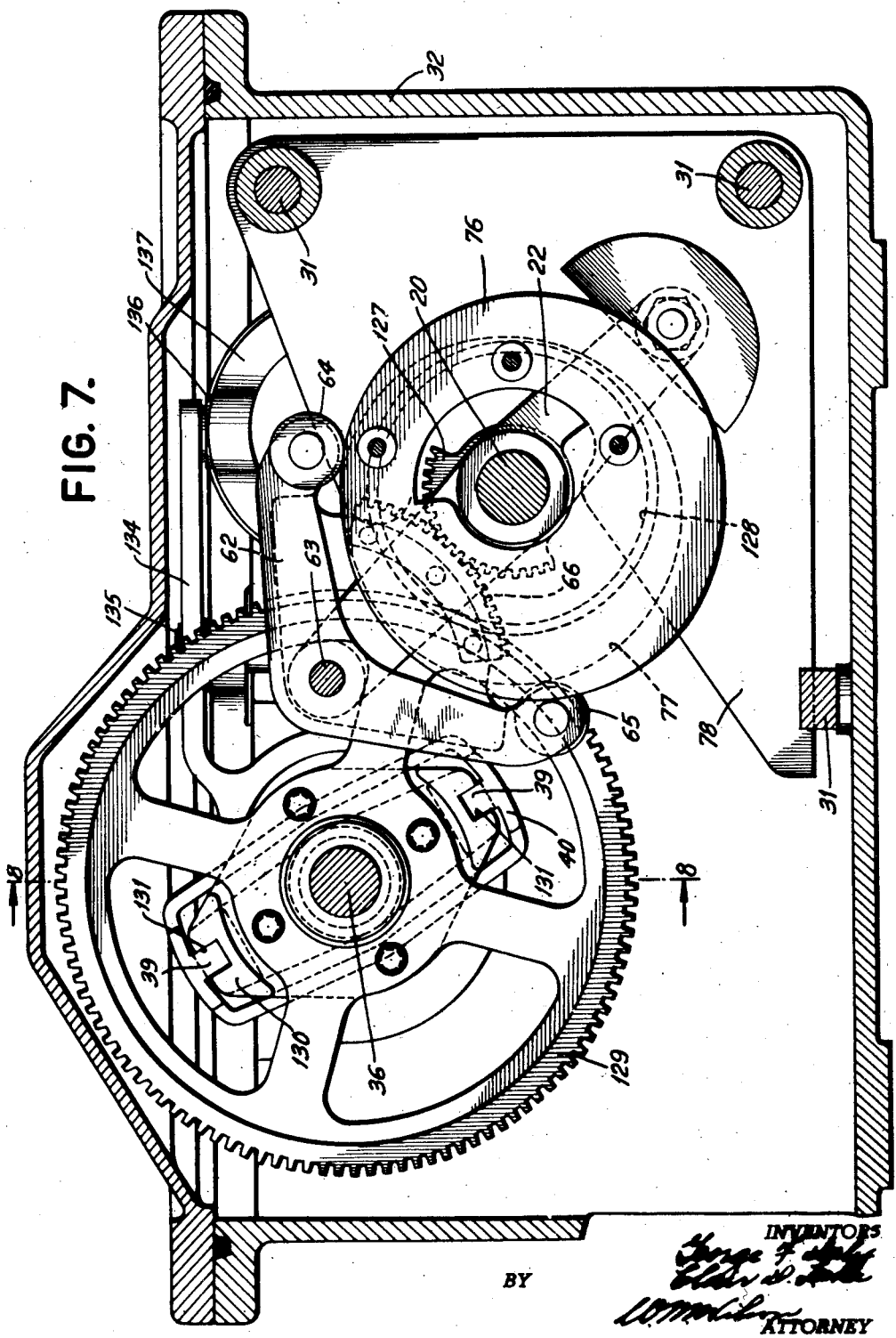
Fig. 7 is a section taken along lines 7—7 of Fig. 6.
Figure 10:
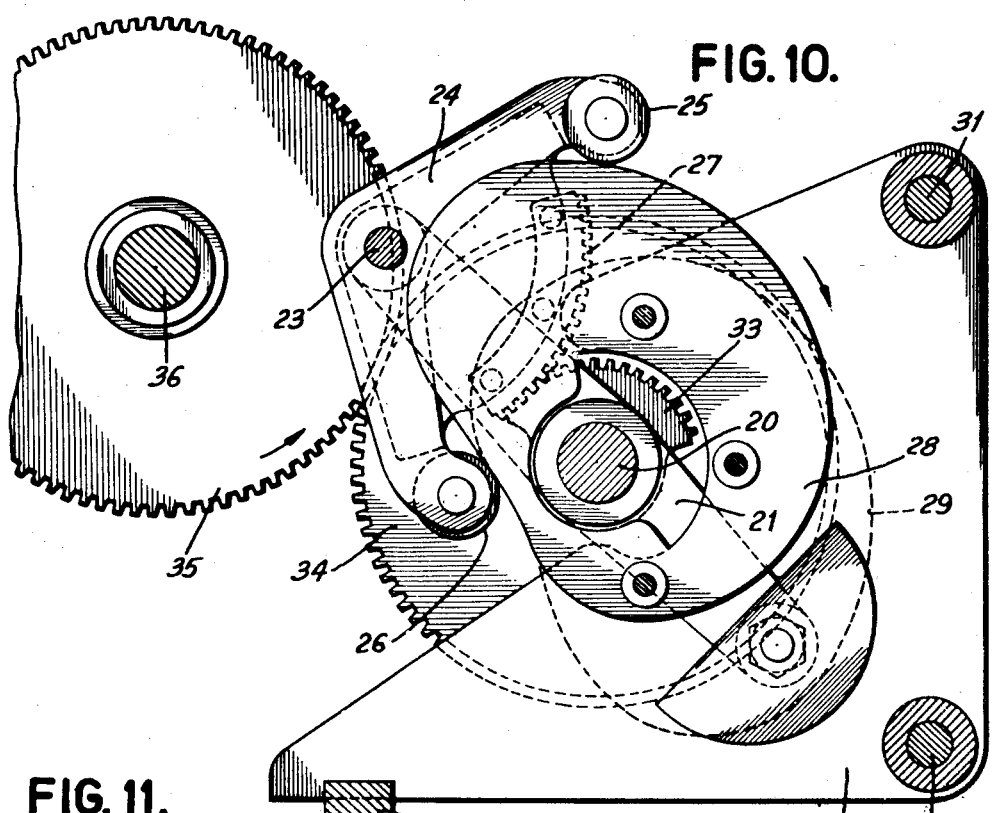
Fig. 10 is a section taken along lines 10—10 of Fig. 6.

Secured to shaft 20 are two counterbalanced arms 21 and 22 shown in Figs. 10 and 7, respectively. Pivoted on pin 23 in arm 21 is an angular rocker arm 24 whose extremities support rollers 25 and 26 and which has integral therewith a segment of an arcuate rack 27. The rollers 25 and 26 cooperate with stationary cams 28 and 29, respectively, these being complementary cams which serve to oscillate arm 24 as arm 21 rotates. The cams 28, 29 are supported by side plates 30 held by cross rods 31 which are in turn mounted in the main casting 32.

Figure 8:
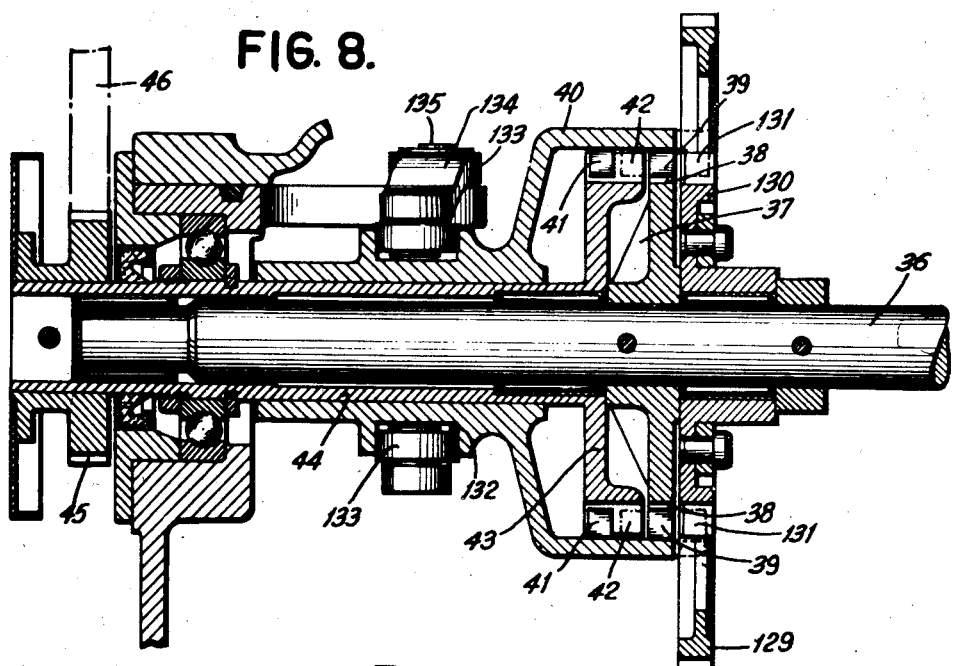
Fig. 8 is a section taken along lines 8—8 of Fig. 7.
Figure 9:
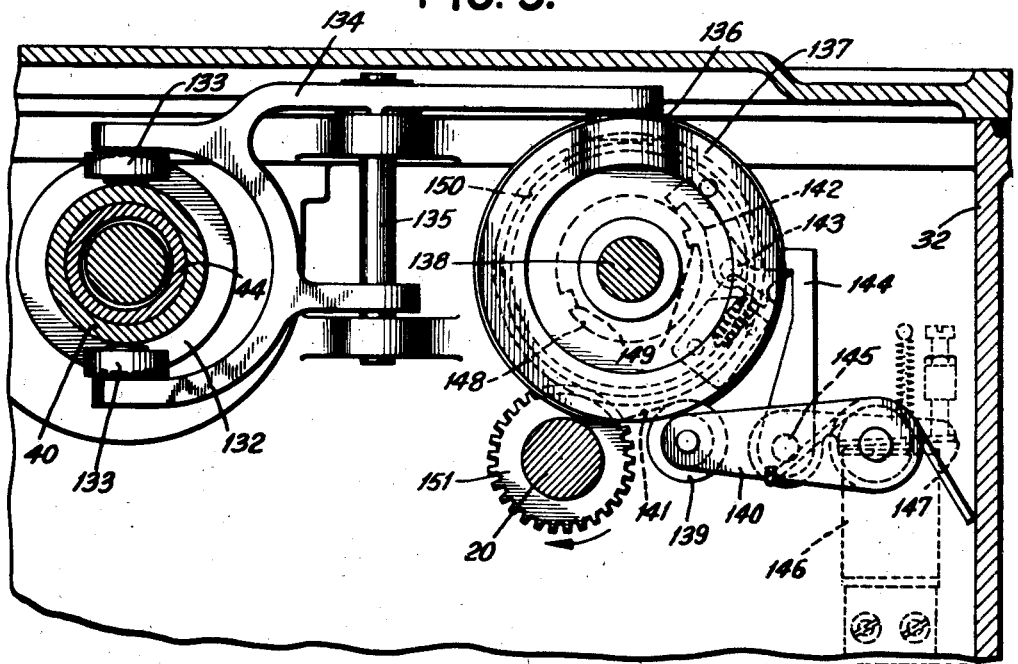
Fig. 9 is a section taken along lines 9—9 of Fig. 6.

Meshing with sector 27 is a gear sector 33 rotatably mounted on shaft 20 through a suitable needle bearing. This sector 33 is integral with a gear 34 which meshes with a gear 35 secured to a shaft 36. Referring now to Fig. 8, shaft 36 has secured thereto a member 37 provided with opposite notches 38 (see also Fig. 7). Into these notches extend lugs 39 of a member 40 which has a second pair of lugs 41 extending into notches 42 of a lever 43 which is integral with a tubular shaft 44.

To the extremity of shaft 44 is secured a gear 45 (see Fig. 4) which through an idler gear 46 drives gears 47 on shafts 48 which in turn through gears 49 drive gears 50 on the contact roller shafts. The gears 50 drive suitable gears on drive rollers 51 which together with the contact rollers grip the edges of the cards to advance them through the machine.

The left hand gear 50 (Fig. 3) drives a gear 52 whose shaft carries a disk 53 on which a link 54 is eccentrically pivoted. The other end of link 54 is pivoted to an arm 55 secured to a rod 56 which in Fig. 4 has secured thereto a gear sector 57 meshing with rack teeth in the reciprocable picker slide 58.

The right hand gear 50 (Fig. 4) through idlers 59 drives stacker drum 17 through a gear 60. On this drum are the usual spring pressed clips 61 which receive the leading edge of the card and swing the card around into position in stacker 18.

The alternate drive for the card feed rollers will now be explained. Referring to Figs. 5 and 7, the counterbalanced arm 22 carries an angular rocker arm 62 pivoted on pin 63 in the arm. The rocker arm's extremities support rollers 64 and 65 and an arcuate rack 66 is integral with the arm. The rollers 64 and 65 cooperate with stationary cams 76 and 77 respectively, these being complementary cams which serve to oscillate arm 62 as arm 22 rotates. The cams 76, 77 are supported by side plates 78 held by cross rods 31.

Meshing with sector 66 is a gear sector 127 rotatably mounted on shaft 20 through a suitable needle bearing. This sector 127 is integral with a gear 128 which meshes with a gear 129, which is freely rotatably on shaft 36. Gear 129 has secured thereto a member 130 provided with a pair of opposite notches 131 (see also Fig. 8), which drive lugs 39 when the latter are in their dotted line position as viewed in Fig. 8. When lugs 39 are in such position, they are free of notches 38 in member 37 and their companion lugs 41 are shifted to their dotted position where they still drive member 43 and tubular shaft 44, so that the movement of the card feed rollers is now under control of the cams driving gear 129.

The member 40 which carries lugs 39, 41 is axially slidable along shaft 44 to shift the lugs from one position to the other with their full line position being the normal one. The member 40 is grooved at 132 (Figs. 6 and 8) to receive rollers 133 on a lever 134 pivoted at 135, whose opposite arm carries a roller 136 which rides in the groove of a box cam 137 (see also Fig. 9).

The cam 137 is secured to a shaft 138 mounted for rotation in suitable bearings. A roller 139 (Fig. 9) is urged by a spring pressed arm 140 into a notch 141 of the cam 137 to detent the cam against clockwise rotation. A clutch dog 142 pivoted at 143 to the cam has a toe engaged by a latch 144 mounted on rod 145, which latch holds the cam against counterclockwise rotation. Upon energization of a magnet 146 its armature 147 rocks rod 145 and latch 144 to release dog 142 for engagement with a notched driving disk 148, which is provided with opposite notches 149.

Disk 148 is integral with a gear 150 (see Fig. 5) meshing with a gear 151 on the main drive shaft 20 at a 2 to 1 ratio, so that for each revolution of shaft 20 disk 148 makes a half revolution. Thus, when magnet 146 is energized, cam 137 is coupled to disk 148 and will make a complete revolution while shaft 20 makes two revolutions, and during its revolution cam 137 shifts lever 134 to slide member 40 (Fig. 8) so that the card feed rollers are driven from gear 129 instead of from gear 35.

Before explaining the effect of thus changing the drive connections to the card feed rollers, a brief explanation will be given of the well known printing mechanism which the card sensing brushes are to control.

Printing mechanism

Figure 1:
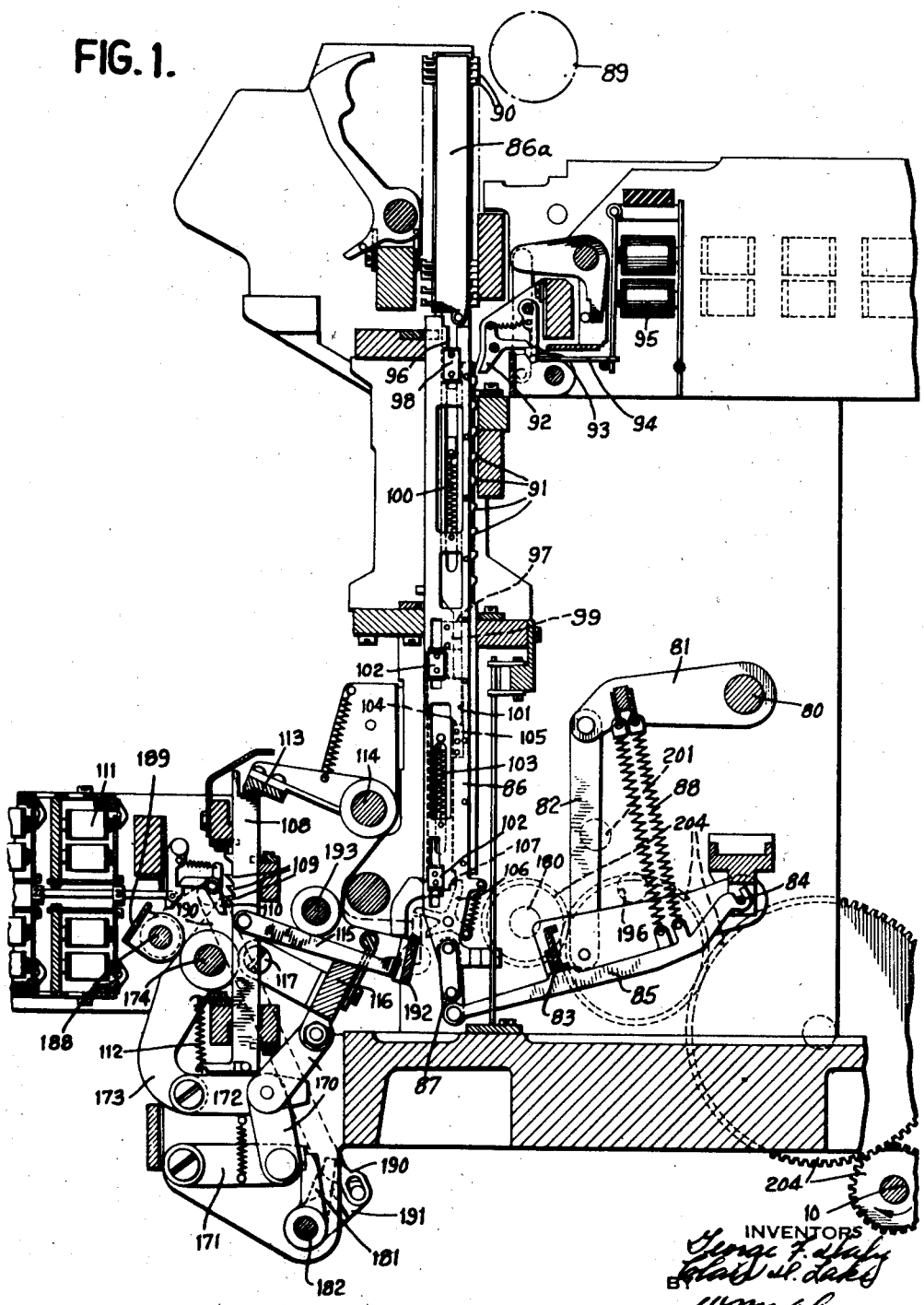
Fig. 1 is a central section of the printing mechanism to be controlled by the record cards.
Figure 2:
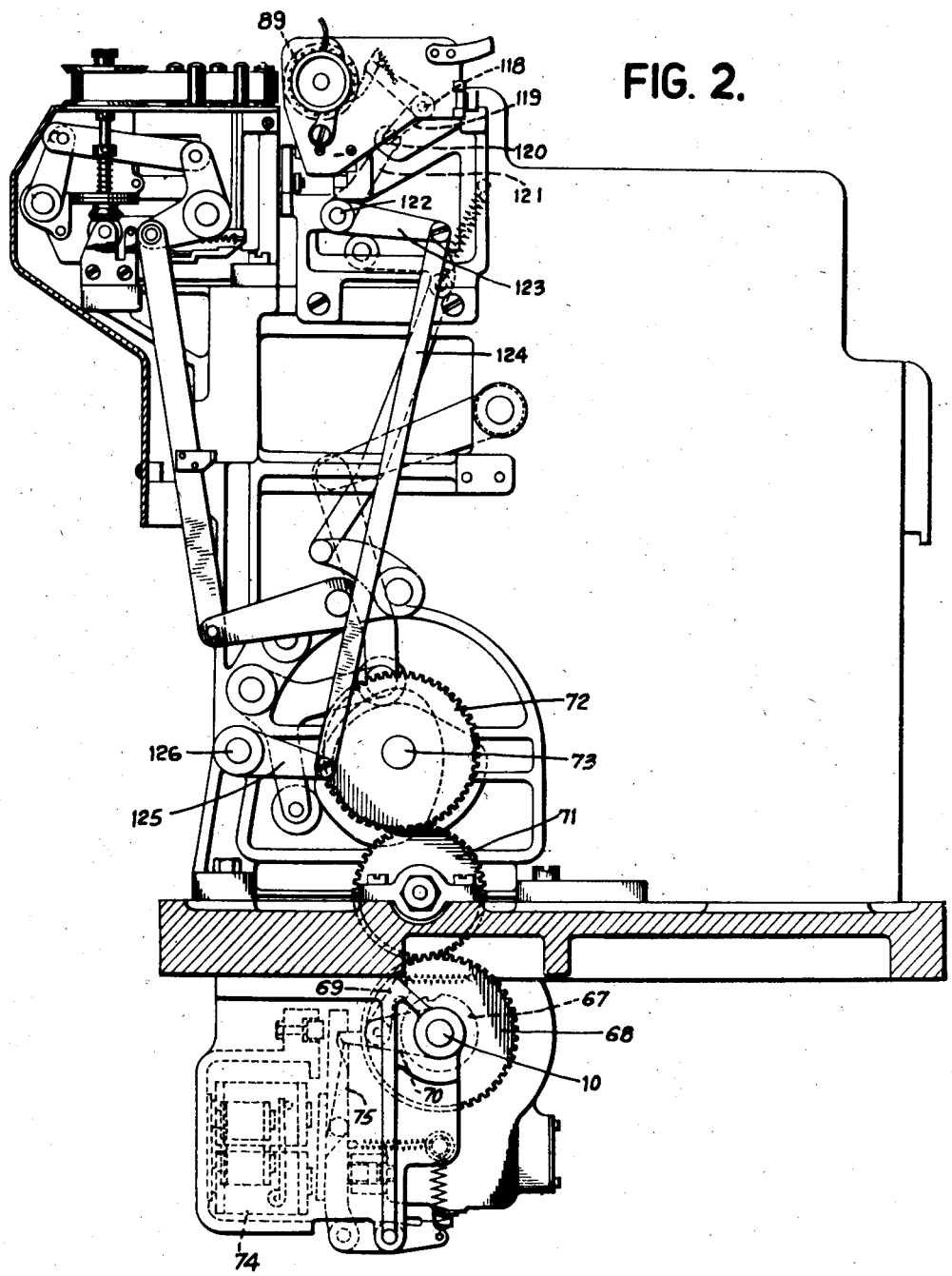
Fig. 2 is an outside view of the printing mechanism.

Referring to Figs. 1 and 2, shaft 10 is coupled in any suitable manner to the drive shaft 20 for rotation therewith at a one to one ratio. Shaft 10 carries a notched disk 67 adjacent to gear 68, which disk is adapted to be engaged by a dog 69 pivotally mounted on an arm 70, which arm is integral with the gear 68. Driving connection is established upon energization of print clutch magnet 74 which rocks its armature 75 counterclockwise to release dog 69 for engagement with the constantly running notched disk 67. For the purpose of the present invention, it may be assumed that magnet 74 is constantly energized so that the driving connection is continuously maintained.

Shaft 80 (Fig. 1) is the usual rocker shaft which is oscillated through cams (not shown) on shaft 73 of Fig. 2. Shaft 80 carries arms 81 which have depending link connection 82 with a bail 83 pivoted at 84. Also pivoted at 84 are type carrier actuating arms 85 which are connected at their free ends to the lower extremity of type carriers 86 through link connections 87. Arms 85 are urged in a clockwise direction by springs 88 which are connected at their upper ends to a cross bar extending between arms 81.

The type carriers are provided with type elements for printing the letters of the alphabet as well as the digits and is substantially that shown in the Patent No. 2,016,682 granted to A. W. Mills, October 8, 1935, so that a brief description herein will suffice to explain its manner of operation. It includes the usual platen 89 past which the type carriers 86 are reciprocated. The head 86a of each type carrier 86 has type elements 90 adapted to print the numerals 1 to 9 and the letters A to Z. The type elements are arranged in nine groups in the following order: 9, I, R, Z; 8, H, Q, Y; 7, G, P, X; 6, F, O, W; 5, E, N, V; 4, D, M, U; 3, C, L, T; 2, B, K, S; 1, A, J. Near the bottom of the type head are two zero type elements. The numerical type elements 90 correspond to the usual numerical type elements of a conventional Hollerith type bar but are spaced far enough apart to make room for three alphabet type elements between successive numeral type elements which are selected for a printing operation in the same manner as in conventional Hollerith tabulating machines, for instance, as in Patent No. 1,822,594, under control of a perforation in one of the index point positions 1 to 9 of a record column. The alphabetic type elements are selected under control of combinations of perforations, each of which may comprise a perforation in one of the index point positions 0, X and R, with another in one of the remaining nine index point positions.

The selection of the alphabetic type elements 90 is effected by arresting each carrier 86 in the appropriate position corresponding to the value of the perforation in index point positions 1 to 9 of the record card and by further movement of the type head 86a relative to its carrier one, two, or three steps, according to whether the other perforation of the combination necessary for a selection is in the R, X or 0 position. The mechanism which effects relative movement between each carrier 86 and its type head 86a is termed the zoning mechanism. Each carrier is provided with a series of stops 91 which represent the corresponding index point positions 0 to 9 on the record card. As the carrier is moved upwardly, the stops 91 move in succession to pass a stopping pawl 92. The latter is held in the position of Fig. 1 by a latch 93, which has connection 94 with the armature of the usual printing magnet 95. When a carrier is used to print numerals only, it will, of course, be controlled by a single perforation in one of the index point positions 0 to 9, inclusive. In such case, each type head and its carrier is maintained in the relationship shown in Fig. 1 and, as the card is analyzed, a circuit is completed through a perforation in the card which will energize the magnet 95 and will effect a release of pawl 92, causing it to engage the stop 91 corresponding in value to the location of the single perforation in the record card column. This operation results in bringing the corresponding numeral type element to the printing line.

The carrier 86 is provided with a slot 96 and a guide 97 which are adapted to receive a slotted block 98 and the lower end 99, respectively, of the type head 86a, the block sliding within the slot 96 and the lower end 99 sliding in the guide 97.

A spring 100, whose lower end is anchored to the carrier 86, is provided at its upper end with a hooked member which engages the lower edge of an opening in the shank of the type head, the spring 100 tending to resiliently hold the head in cooperation with the carrier 86. Mounted upon the lower portion of each carrier 86 is a slide 101 provided with grooved blocks 102 which cooperate with suitable slots in the carrier 86. A spring 103, anchored at its lower end to the carrier and at its upper end to the slide 101, tends to move the slide downwardly to bring a shoulder 104 in the slide into engagement with a block 105 riveted to the carrier 86. With the parts assembled as in Fig. 1, the spring 103 urges the type head 86a in the same direction so that the lower end 99 thereof engages the slide 101. It is plain that, if the slide 101 is moved upwardly relative to the carrier 86, the type head 86a will move likewise. A spring-pressed latch 106 pivoted at the lower end of the carrier 86 is adapted to cooperate with three shoulder stops 107 formed in the lower end of slide 101. When the slide is moved upwardly one or more steps with respect to the carrier, the latch 106 will cooperate with one of the stops 107 to hold the parts in their displaced relationship.

Associated with each alphabetic type bar assembly is a vertically slidable comb 108 which is adapted to be moved downwardly and then upwardly during each cycle of the machine. Each comb has a series of three stops or lugs 109 which, on the upward movement of the comb, pass a stopping pawl 110 in synchronism with the passage of the zone perforations 0, X and R by the analyzing brushes of the machine. Each pawl 110 is controlled by a zone magnet 111, the energization of which operates its armature to release pawl 110, allowing the latter to be moved by its spring into engagement with one of the stops 109. By this action, further upward movement of the comb 108 is prevented for the time being. The combs 108 are moved upwardly by means of springs 112 and moved downwardly by a bail 113 secured to a shaft 114. The bail engages the upper ends of the combs and moves the latter downwardly whenever the shaft 114 is rocked at the proper time.

The comb 108 has pivoted thereto an arm 115 whose free end lies in the path of movement of the associated slider 101 and whose lower edge rests upon a bail 116 which is pivoted at 117. Under control of the zone perforations the pivot point of arm 115 may take one of three positions below that of Fig. 1. In this figure the parts are shown with the comb in the position it assumes when no zone holes are present in the card, that is, when numerals only are to be printed. When the carrier 86 is in its lowermost position, the ball 116 is rocked in a counterclockwise direction to move the arm 115 in a similar direction into engagement with the lower extremity of slide 101. It will be apparent that the distance which the free end of arm 115 is moved upwardly under control of the bail 116 depends upon the location of the pivot point of arm 115 at such time. Thus, if the pivot point is located as shown in Fig. 1, the free end of arm 115 will be moved upwardly to a position where it barely touches slide 101. A zone perforation in the zero index point position will result in the movement of the free end of arm 115 three steps upwardly from the position of Fig. 1. A perforation in the X position will cause it to move two steps while a perforation in the R position will cause it to move only one step above the position in Fig. 1. These steps of movement are, of course, transmitted to the slide 101 and it, in turn, will be moved upwardly one, two or three steps in accordance with the setting of the related comb 108, the latch 106 carried by the carrier 86 serving to hold the slide in its displaced position with respect to the carrier.

It will be understood from the foregoing description and the more detailed explanation found in Patent No. 2,016,682, that in the case where a perforation occurs in one of the 1 to 9 index point positions only, the mechanism controlled by the zone magnets 111 will not be effective to shift slide 101 relative to carrier 86 and the type bar assembly will be arrested differentially, purely by the operation of print magnet 95, as in former Hollerith tabulating machines.

Bail 116 is actuated through the medium of a toggle mechanism comprising links 170, one of which is pivoted to the bail 116 and the other is pivoted to an arm 171. The point of connection of the links carries an arm 172 which is also pivoted to an arm 173 secured to a shaft 174.

An arm 181 carried by a rod 182 is adapted to be rocked from its dotted to its full line position prior to the straightening of the toggle links 170, so that shaft 174 is rocked in a counterclockwise direction.

As the type carrier 86 descends from printing position with the slider 101 held in displaced position by latch 106, it is necessary to first restore the slider to its lowermost position before effecting a new zone setting thereon. To this end a bail 192 is provided which is moved to the dotted line position of Fig. 1 before the carrier reaches the lower extremity of its movement. In such position the bail 192 is in the path of an extending arm of latch 106 and, as the carrier continues its descent, the extension will engage bail 192 and cause clockwise rocking of latch 106 to release slide 101. Following this action, the bail 192 is lowered and the slide 101 is in readiness to receive a new setting under control of arm 115.

The operating mechanism for the several bails and levers has not been shown, as such is well known and disclosed in Patent No. 2,131,919 to A. W. Mills et al. dated October 4, 1938.

Referring to Fig. 2, the statement or invoice is carried by the platen 89 supported by the paper carriage frame in the usual manner. Spacing of the platen is effected by the usual pawl and ratchet operated from shaft 118 journaled in the paper carriage. Fixed to shaft 118 in an arm 119 carrying a rod 120 cooperating with a bifurcated lever 121 mounted on stud 122. To this stud is secured an arm 123 connecting through link 124 with an arm 125 on shaft 126.

Figure 13:
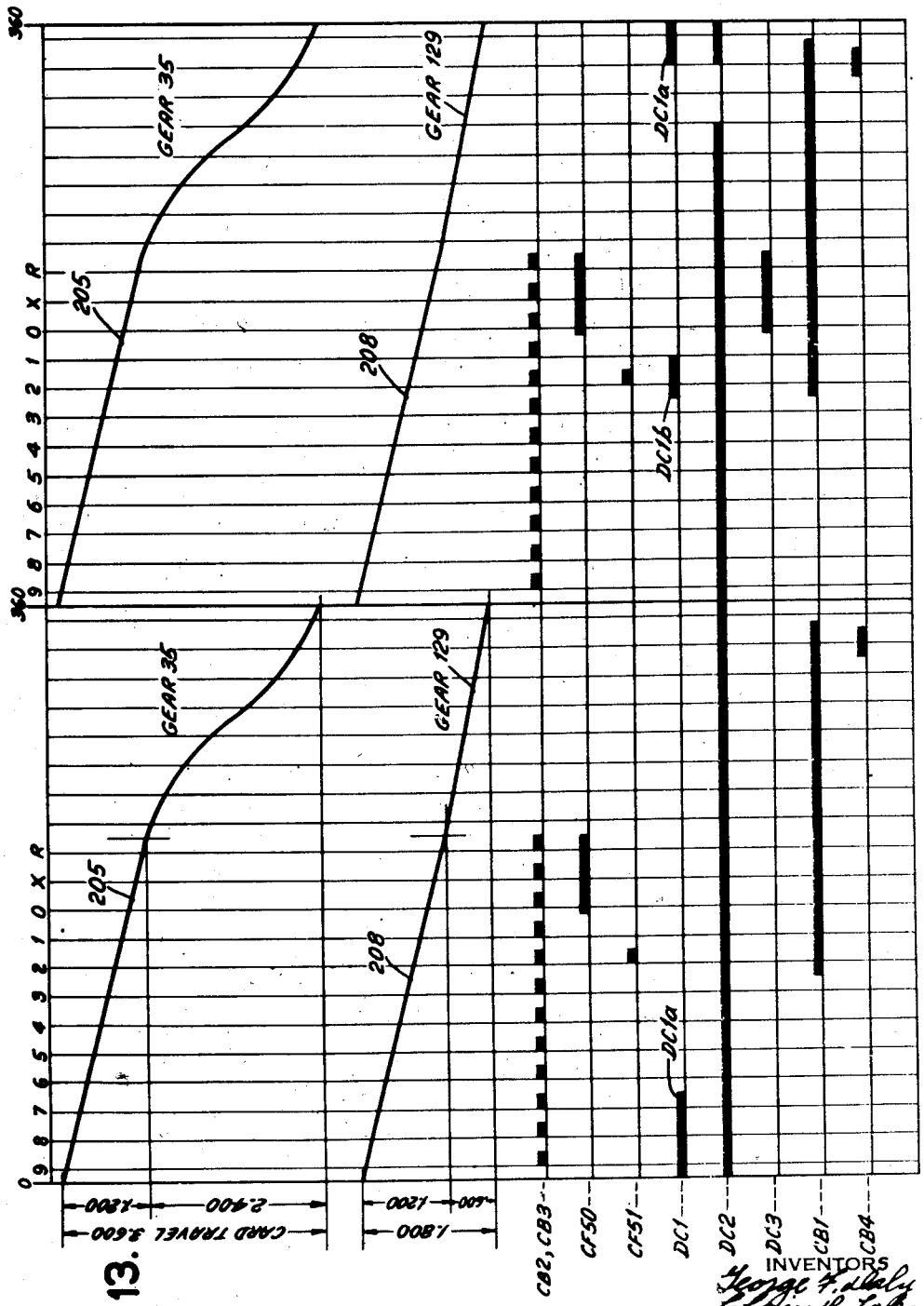
Fig. 13 is a timing diagram of the speed controlling gears and the contact operating devices.

Referring to Fig. 13, the normal operation of the card feeding mechanism under control of gear 35 is represented by the line 205 which indicates that the card travels the distance 1.200 with a uniform motion during the part of the cycle when the index point positions are passing the sensing brushes. Thereafter, during the remainder of the cycle, the card advances rapidly the remaining distance 2.400. With respect to the sensing brushes A to D (Fig. 4), the card movement under control of gear 35 is such that during the first part of the cycle the index point positions of a deck (upper or lower) pass one of the rows of brushes for sensing thereby (for example, the lower deck L of a card passes brush C, while the upper deck concurrently passes brush D) and print controlling circuits are completed for both decks. Then in the latter part of the cycle the upper deck moves rapidly past brush C, without being sensed thereby, and the lower deck moves rapidly past brush B without being sensed thereby. This is the normal manner of operation wherein the cards feed the distance 3.600 for each cycle.

The operation of the card feeding mechanism under control of gear 129 is represented by the line 208 which indicates that the card travels the distance 1.200 with a uniform motion during the part of the cycle when the index point positions are passing the sensing brushes. It is to be particularly noted that this part of the card travel is exactly the same as when gear 35 controls the movement.

It is during this part of the cycle that the type bars are raised and the type elements pass the printing position in the order 9, 8, 7, 6, etc., at the times indicated in Fig. 13, so that circuits through the sensing brushes will control the printing mechanism in the same manner whether the drive is from gear 35 or gear 129.

The difference in drive occurs during the last half of the cycle, where for gear 129 line 208 indicates that the card advances only the distance .600 where under normal drive by gear 35 it advanced the distance 2.400. This means that, if during the first part of the cycle a lower deck passes brush C, for example, the leading edge advances up to the next brush B during the latter part of the cycle, and in the early part of the next cycle the lower deck passes brush B.

As explained hereinabove, when gear 129 is coupled for driving, it is effective for two machine cycles, and for this reason Fig. 13 shows the timing of the parts for two machine cycles.

Figure 4:
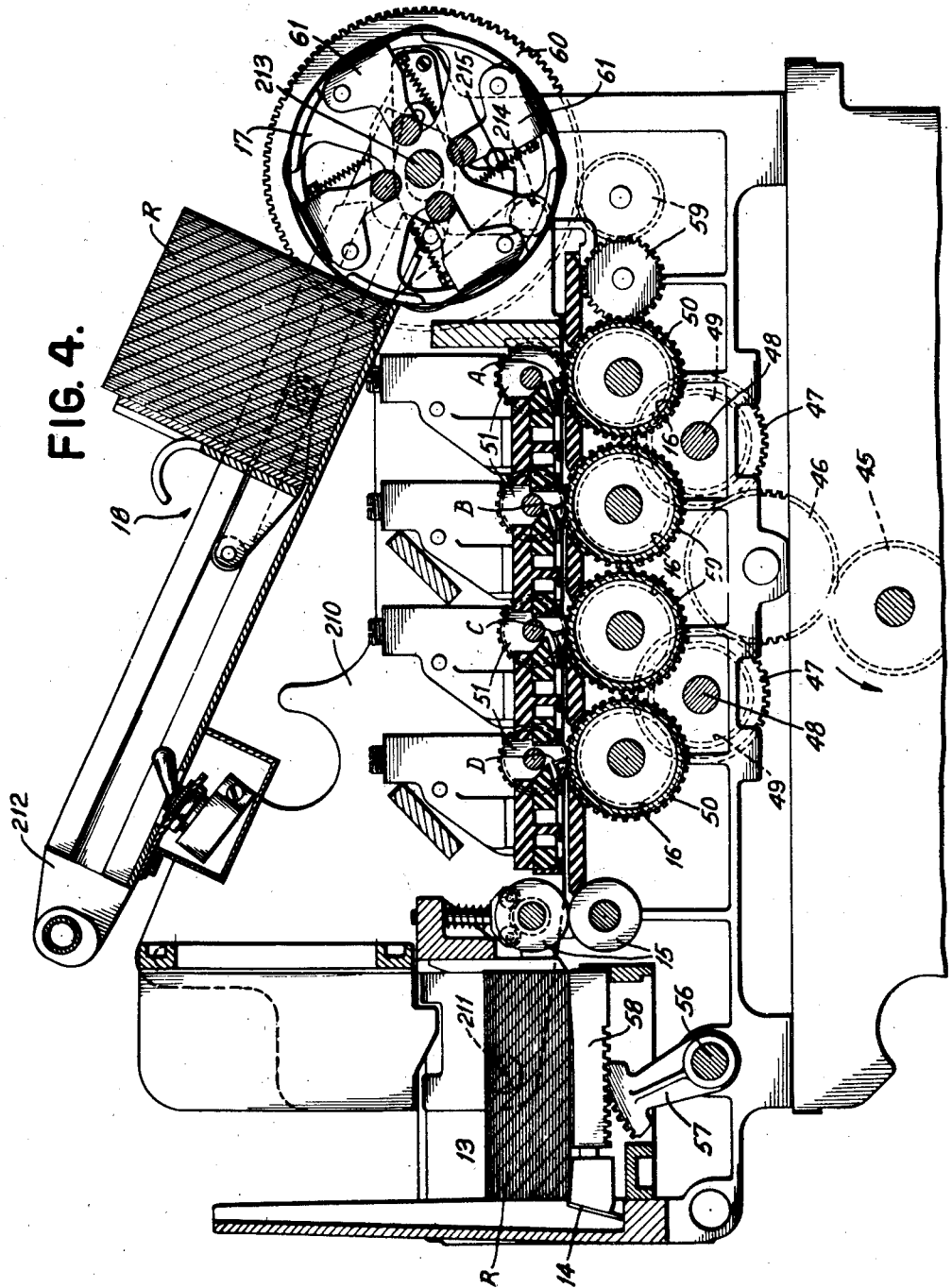
Fig. 4 is a central section through the card feeding mechanism.

Referring to Figs. 3 and 4, the card feed mechanism is constructed so that ready access may be had to the sensing brushes, and a torn card may easily be removed. For this purpose, the shafts of rollers 51 are supported in side plates 210 which are pivoted at 211 to be swung to the broken line position of Fig. 3, carrying therewith the brushes A to D and the cross bars above the line of travel of the card. The side plates 212 of the discharge stacker 18 are pivoted on the shaft 213 of the stacker drum, so that the plates 212 may also be swung to the position indicated in Fig. 3. The plate 210 has a roller 214 at its free end which, after the plate is in its horizontal position, will be engaged by an arm 215 of plate 212 to exert suitable pressure and hold plate 210 in position. The arm 215 is notched where it engages roller 214 and thereby serves as a detent to hold the frames in the positions of Fig. 4.

Circuit diagram

The manner in which the several mechanisms are coordinated will now be explained in connection with the circuit diagram (Fig. 12) and for simplicity it will be assumed that only a single column in each card is sensed, inasmuch as the description will apply to all columns.

In the diagram (Fig. 12) are several cam controlled contacts prefixed CF and CB. The controlling cams for these contacts are driven from the main shaft 10 so as to operate each cycle of the machine, and the timing of the contacts is shown in the timing chart (Fig. 13). Several cam controlled contacts prefixed DC are also provided. These cams are driven from the shaft 138 (Figs. 5 and 6) to make one revolution for two revolutions of shaft 10, when the shaft 138 is coupled for rotation. When the shaft 138 is at rest, the contacts remain in the positions shown in Fig. 12 and their timing is as shown in Fig. 13.

To illustrate the sequential operations, a representative group of cards will be considered arranged as follows:

Card 1 _____ Simplex card
Card 2 _____ Simplex card
Card 3 _____ Duplex card containing hole 12
Card 4 _____ Simplex card
Card 5 _____ Duplex card containing hole 12
Card 6 _____ Duplex card containing hole 12
Card 7 _____ Simplex card Each of these cards contains alphabetic data in a common column which is to be printed on a sheet in the following order, assuming the perforated character to be M in all the card columns:

Card 1 _____ M M
Card 2 _____ M M
Card 3 _____ M
_____ M
Card 4 _____ M M
Card 5 _____ M
_____ M
Card 6 _____ M
_____ M
Card 7 _____ M M The letter M, of course, would represent a complete word or words where each card has multicolumn perforations, and it will be noted that for simplex cards the data of the upper and lower decks is to be printed in separate columns concurrently, while the data of the duplex cards is to be printed from the lower and upper decks in succession and in the same column.

Figs. 14 and 14a comprise a diagram showing cycle by cycle the relationship between the cards and the sensing brushes as these seven cards pass through the machine.

*Cycle 1.*—With the cards placed in magazine 13 (Fig. 4), operation of the picker (under normal drive from gear 35) during the first cycle will advance card 1 to rollers 15, which convey it to a position where its leading edge is just past rollers 15.

*Cycle 2.*—During the first part of cycle 2, deck L of card 1 advances to brush D, the motion being uniform as indicated by line 205 of Fig. 13, the movement of the card being represented by the distance 1.200 as indicated in Fig. 13, which brings the leading edge of the card up to brush D. Thereafter, under control of gear 35, the rollers 50 are rapidly turned to advance the card the distance 2.400 so that, at the end of the cycle, the leading edge is at brush C with the field L being moved rapidly past brush D in this latter part of the cycle.

Figure 12:
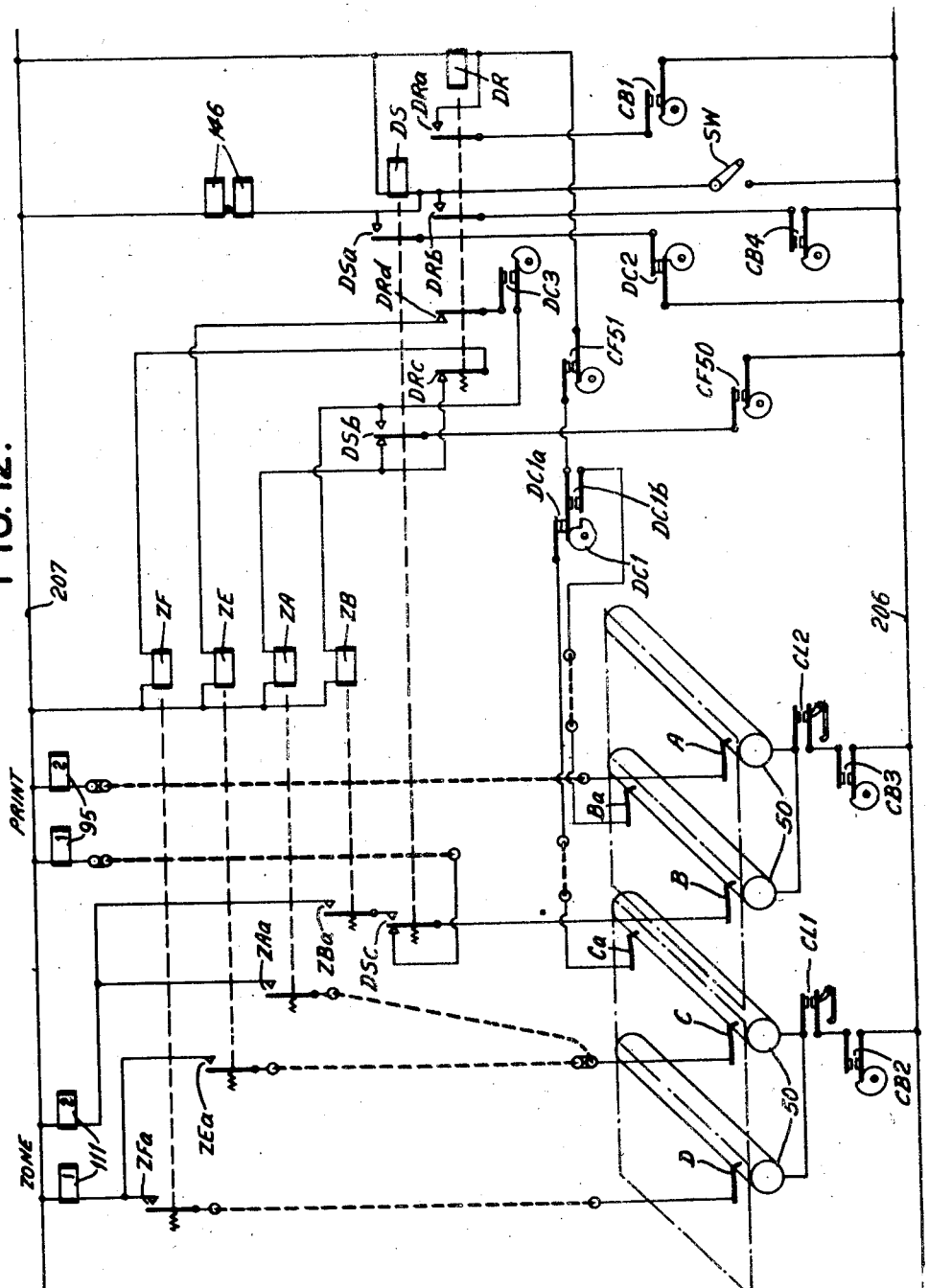
Fig. 12 is a wiring diagram of the electric circuits of the mechanism.

No circuits are completed through brush D during this cycle 2, since as seen in Fig. 12 the rollers 50 of brushes D and C receive current from line 206 through card lever contacts CL1 of the well known type, which are located to close only while a card is passing brush C. A similar pair of contacts CL2 is provided to supply current to rollers 50 of brushes B and A only, while cards are passing brush A.

*Cycle 3.*—During this cycle, deck L of card 1 passes brush C while deck U passes brush D. No circuits are completed as the positions 9 to 1 pass the brushes, since contacts ZAa and ZFa are open during such interval. However, when contacts CF50 close during the sensing of the 0, X and R positions (see Fig. 13), circuits are completed through the zone holes 0, X and R to energize the zone magnets 111 of two different type bars. Closure of contacts CF50 completes a circuit from line 206 (Fig. 12), contacts CF50, left hand contacts DSb, contacts DRc, relay ZF to line 207. Concurrently, the circuit branches to energize relay ZA. Thus, as the zone holes of the upper and lower decks of card 1 pass brushes D and C, respectively, the contacts ZFa and ZAa are in closed condition, so that circuits are completed for brushes D and C as follows:

For brush D; from line 206, contacts CB2, CL1, roller 50, zone hole 0, X or R, the upper deck of card 1, brush D, contacts CFa, the 1 zone magnet 111 to line 207. For brush C; from line 206, contacts CB2, CL1, roller 50, zone hole in the lower deck of card 1, brush C, contacts ZAa, the 2 zone magnet 111 to line 207. Thus, both decks of card 1 concurrently adjust the zoning mechanism of Fig. 1 for subsequent printing from the selected zones of the type on the type bars.

After the zone holes of card 1 are sensed, gear 35 rapidly advances the feed rollers to bring the leading edge of the card 1 up to brush A at the end of the cycle, and in doing so deck L passes brush B rapidly in the second half of the cycle. Concurrently, card 2 which was advanced from the magazine during cycle 2 (Fig. 14) moves rapidly to present its leading edge to brush C.

*Cycle 4.*—During this cycle, circuits are concurrently completed through both decks of card 1 to energize the print magnets 95 related to the zone magnets 111 energized in the previous cycle, so that the type representing the characters in the sensed card columns will be positioned for printing. The circuit for brush B is traceable from line 206, contacts CB3, CL2, roller 50, digit hole 9 to 1 in the upper deck of card 1, brush B, left hand contacts DSc, the 1 magnet 95 to line 207. Concurrently, the circuit for brush A is traceable from line 206, contacts CB3, CL2, roller 50, digit hole 9 to 1 in the lower deck of card 1, brush A, the 2 magnet 95 to line 207.

During the sensing of positions 0, X, R, contacts CF50 again close to energize magnets ZF and ZA as in the preceding cycle, so that now brushes D and C energize the zone magnets 111 in accordance with the zone holes in card 2. In the latter part of the cycle the rollers are again rapidly advanced to bring the leading edge of card 1 to the stacker drum, to bring the leading edge of card 2 to the brush A, and to bring the leading edge of card 3 to the brush C.

It may be mentioned at this point that, if all the cards fed through the machine were simplex cards, the operations just explained for cards 1 and 2 would be repeated for all cards. Specifically, each card would pass brushes D and C during one cycle for concurrent zoning of upper and lower decks and would pass brushes B and A during the following cycle for concurrent printing from both decks, while zoning takes place from the next following card.

*Cycle 5.*—In the first half of this cycle the 9 to 1 positions of the lower and upper decks of card 2 pass brushes A and B respectively to position the type bars to print the data of card 2 in the same manner as for card 1.

Concurrently, the upper and lower decks of card 3 move past brushes D and C, respectively. This card as noted in Fig. 14 is a duplex card containing the identifying hole 12 (see Fig. 11) in the 2 index point position of the lower deck. Accordingly, when this 2 index point position is at the special brush C*a* (Fig. 12), a circuit is completed from line 206, contacts CB2, CL1, roller 50, 2 hole in the lower deck, brush C*a*, contacts DC1*a* (normally closed), contacts CF51 (closed at the 2 time, see Fig. 13), relay DR to line 207.

Relay DR closes its contacts DR*a* to provide a holding circuit which maintains the relay energized until the end of the cycle. This circuit is traceable from line 206, contacts CB1, DR*a*, relay DR to line 207. Relay DR opens its contacts DR*c* so that, as the zone positions of card 3 pass brushes D and C, only relay ZA will be energized as the circuit for relay ZF is open at contacts DR*c*. Consequently, the zone magnet circuit is completed only from the lower deck L of card 3 to energize the 2 zone magnet 111. After the sensing of the zone positions, the cards are again rapidly advanced so that at the beginning of cycle 6 the leading edge of card 3 is at brush A, and the leading edge of card 4 is at brush C. During this rapid advance portion of cycle 5, cam contacts CB4 (Fig. 12) close, while contacts DR*b* are still closed, and a circuit is completed from line 206, contacts CB4, DR*b*, relay DS and clutch magnet 146 in parallel to line 207. Relay DS closes its contacts DS*a* to provide a holding circuit from line 206, contacts DC2, DS*a*, relay DS and magnet 146 to line 207. The energization of magnet 146 places the feed roller drive under control of gear 129 and in the next following two cycles the cards will advance the same distance that they traveled in one of the previous cycles, and during these two cycles the DC cam contacts are operated with the time of closure thereof as represented in Fig. 13.

As noted in Fig. 13, gears 35 and 129 both advance the card the distance 1.200 with the same uniform movement during the part of the cycle that the index point positions traverse the sensing brushes, so that the time of completion of a circuit through a hole in any index point position will occur at the same point for any cycle.

*Cycle 6.*—At the beginning of this cycle, relay DS is in energized condition and relay DR is deenergized. Accordingly, relays ZA and ZF cannot be energized and the upper and lower deck of card 4 which now passes brushes D and C, respectively, will not complete any circuits, since contacts ZF*a* and ZA*a* are open.

As the lower deck L of card 3 passes brush A, a circuit is completed to the 2 print magnet 95 for printing from this deck during cycle 6. During the zone sensing time when contacts CF50 close, a circuit is traceable from line 206, contacts CF50, right hand contacts DS*b*, relay ZB to line 207. Thus, as the zone positions pass brush B in this cycle, a circuit is completed from line 206, contacts CB3, CL2, roller 50, perforation in 0, X or R position of the upper deck of card 3, brush B, right hand contacts DS*c*, contacts ZB*a*, the 2 zone magnet 111 to line 207.

Since the gear 129 is now controlling the drive, the cards advance slowly during the latter part of the cycle, so that at the end thereof the upper deck U of card 3 is in readiness to pass brush A and leading edge of card 4 is about to pass brush B. It is to be noted that the slowing down of the card feed also slows down the movement of the card picker 14, so that while the upper deck of the card is now passing brush A the picker is returning in readiness to advance a card in the next following cycle and in effect skips feeding during one cycle.

*Cycle 7.*—During this cycle, brush A reads the upper deck of card 3 and completes the circuit to the 2 print magnet 95, so that printing takes place for the upper deck of card 3. For card 4, the lower deck is passing brush B and the upper deck is passing brush C. At the zoning time contacts DC3 (Fig. 12) are closed and circuits are completed to concurrently energize relays ZB and ZE through contacts CF50. The circuit for relay ZE is traceable from line 206, contacts CF50, right hand contacts DS*b*, contacts DC3, contacts DR*d* (closed at this time), relay ZE to line 207. Relay ZE closes its contacts ZE*a*. As a result, the 1 and 2 zone magnets 111 are energized from the upper and lower decks respectively through contacts ZE*a* and ZB*a*.

Near the end of this cycle, contacts DC2 open to deenergize relay DS and the clutch magnet 146 so that the drive reverts to control by gear 35.

*Cycle 8.*—In the first half of this cycle, brushes A and B complete circuits to the 2 and 1 magnets 95 respectively to print the data in the lower and upper decks respectively of card 4. At such time, it should be noted relays ZB and DS are not energized. The lower deck of card 5 is now passing brush C and, since it is a duplex card, the 2 hole is sensed by brush C*a* and relay DR becomes energized again. Thereupon, as explained for cycle 5, only relay ZA becomes energized during the zoning period of the cycle to zone the data in the lower deck of card 5.

*Cycle 9.*—This cycle is similar to cycle 6 and is the first of the two cycles in which gear 129 controls the feed rollers. As card 5 passes brushes B and A, the upper and lower decks of card 6 passes brushes D and C, respectively, but no circuits are completed through these latter brushes. It is to be noted that the special 2 hole (12) in card 6 is not read in this cycle by brush CA, because cam contacts DC1*a* and DC1*b* are both open at the 2 time of the cycle (see Fig. 13).

*Cycle 10.*—In this cycle the lower deck of duplex card 6 passes brush B and the special 2 hole completes a circuit from line 206, contacts CB3, CL2, roller 50, 2 hole, brush B*a*, contacts DC1*b* (closed at the 2 time of the second slow cycle), contacts CF51, relay DR to line 207. Relay DS is still energized at this time, so that during the zoning period relay ZB is energized through contacts DS*b*, but relay ZE is not energized because contacts DR*d* are held open. As a result, brush B energizes zone magnet 111 in accordance with the data in the lower deck of card 6.

*Cycle 11.*—At the beginning of this cycle, relay DS is in energized condition. During the first half, brush A reads the lower deck of card 6 to control the 2 print magnet 95. During the zoning period, relay ZB is energized so that brush B energizes the 2 zone magnet 111 from the upper deck of card 6. This cycle is similar to cycles 6 and 9.

Cycle 12.—This cycle is similar to cycle 7, since the following card is a simplex card. If card 7 were a duplex card, this cycle would be similar to cycle 10, in which the special hole 12 is sensed by brush Ba.

Cycle 13.—In this cycle the last card 7 passes brushes A and B and both decks are listed.

From an analysis of the sequence of operations for a representative sequence of cards as above explained, it is to be noted that brush A is used only for listing and brush D for zoning. Brush B will list as well as zone with the zoning being of both simplex and duplex cards. Brush C will also zone either type of card. The various conditions under which the brushes function are dependent upon the types of cards following one another past the brushes during any cycle, and in the following table these relationships are set forth in accordance with the functions of the brushes A to D.

*Listing*

Brush A:
   Lists lower deck of a simplex card.
   Lists lower deck of a duplex card.
   Lists upper deck of a duplex card.
Brush B:
   Lists upper deck of a simplex card.

*Zoning*

Brush B:
   Zones upper deck of a duplex card.
   Zones lower deck of a duplex card, if it follows a duplex card.
   Zones lower deck of a simplex card, if it follows a duplex card.
Brush C:
   Zones lower deck of a simplex card, if it follows a simplex card.
   Zones lower deck of a duplex card, if it follows a simplex card.
   Zones upper deck of a simplex card, if it follows a duplex card.
Brush D:
   Zones upper deck of a simplex card, if it follows a simplex card.

For better analysis, the following table shows the separate card decks with the different brushes which effect zoning and listing from such decks under the varying conditions.

Lower deck of simplex card zoned by brush C, if it follows a simplex card.
Lower deck of simplex card zoned by brush B, if it follows a duplex card.
Lower deck of simplex card listed by brush A.
Upper deck of simplex card zoned by brush C, if it follows a duplex card.
Upper deck of simplex card zoned by brush D, if it follows a simplex card.
Upper deck of simplex card listed by brush B.
Lower deck of duplex card zoned by brush B, if it follows a duplex card.
Lower deck of duplex card zoned by brush C, if it follows a simplex card.
Lower deck of duplex card listed by brush A.
Upper deck of duplex card zoned by brush B.
Upper deck of duplex card listed by brush A.

With the card feeding mechanism arranged as described, simplex and duplex cards may be promiscuously arranged in the feed hopper, feeding of cards will be continuous and uninterrupted, and the interval between cards will always be the same. The machine is constructed for normally handling simplex cards and printing the data from both decks of such card along a single line. For duplex cards there is a speed change to enable the data in the decks of the duplex card to be printed in successive cycles on separate printing lines.

Under some circumstances, it may be desirable to print a separate line from each deck of a card, regardless of the type of card. In such case a switch SW (Fig. 12) is closed to maintain relay DS and magnet 146 continually energized, with the result that throughout the operation of the machine gear 129 exercises driving control of the card feeding mechanism. Brushes D and C are not plug connected, and only brushes B and A will sense the data in the decks with brush B controlling the zone magnets 111 and brush A controlling the digit or print magnet 95.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable machine of the class described, a card sensing element, card feeding mechanism for feeding successive cards past said element, each card being provided with a plurality of decks in which separate data is recorded, certain of said cards having a special designation, and which decks pass the sensing element in succession, printing mechanism controlled by said sensing element in accordance with the data sensed, means for effecting an operation of said printing mechanism for each cycle of operation of the machine, said printing mechanism operation including a printing portion and a restoring portion, means for normally operating said feeding mechanism to cause one deck of a card to pass said sensing element for sensing thereby during the printing portion of the cycle of operation of said printing mechanism, the succeeding deck of the same card to pass said sensing element during the restoring portion and a deck of the following card to pass said sensing element during the printing portion of the next cycle, for sensing by the sensing element, means for sensing said special designation, and means controlled thereby for causing said operating means to control the feeding mechanism to cause the decks of the card having said special designation to pass the sensing element for sensing thereby only during the printing portion of successive cycles of operation.

2. In an alphabetic printing machine, a first, second, third and fourth spaced sensing element, means for feeding record cards past said elements in succession, each card having a lower and an upper deck and each deck having a column of index point positions separated into zone and digit positions in which alphabetic data is combinationally recorded, said elements being so spaced that when any index point position of one deck is at an element, the corresponding index point positions of three adjacent decks are each at one of the other elements, a printing mechanism having a zoning device and a listing device responsive to designations in the zone and digit positions of a card deck respectively, to print the character represented therein, means for causing the second sensing element to control said zoning devices as the zone positions of the lower deck are sensed thereby, means for causing the third sensing element to control said zoning devices as the zone positions of the upper deck are sensed thereby, means for causing the fourth sensing element to control said listing devices as the digit positions of both the upper and lower decks are successively sensed thereby, whereby said printing mechanism will be controlled to successively print the data in the lower and upper decks of a card.

3. In a cyclically operable printing machine having a printing mechanism operable to print during a printing portion of each cycle of the machine, a card sensing element for controlling the printing mechanism and card feeding mechanism for feeding cards past said element in succession, each card having a pair of decks which pass the element in succession, in combination with a first driving means for the card feeding mechanism operative to cause one deck of a card to pass the sensing element for sensing thereby during the printing portion of a machine cycle and the other deck during the remainder of the same cycle, whereby printing will be effected from only one deck and the card will pass the sensing element during a single cycle, a second driving means for the card feeding mechanism operative to cause one deck of a card to pass the sensing element for sensing thereby during the printing portion of one cycle, and the second deck during the printing portion of the succeeding cycle, whereby printing will be effected from both decks of the card, each in a separate cycle, and means controlled by the cards for selectively rendering either driving means effective.

4. In a cyclically operable machine having a settable mechanism operable to receive a setting during a setting portion of each cycle of the machine, a card sensing element for controlling the settable mechanism and card feeding mechanism for feeding cards past said element in succession, each card having a pair of decks which pass the element in succession, in combination with a first driving means for the card feeding mechanism operative to cause one deck of a card to pass the sensing element for sensing thereby during the setting portion of a cycle and the other deck during the remainder of the same cycle, whereby setting will be effected from only one deck and the card will pass the sensing element during a single cycle, a second driving means for the card feeding mechanism operative to cause one deck of a card to pass the sensing element for sensing thereby during the setting portion of one cycle and the second deck during the setting portion of the succeeding cycle, whereby setting will be effected from both decks of the card, each in a separate cycle, and means controlled by the cards for selectively rendering either driving means effective.

5. In a cyclically operable machine of the class described, a card sensing element, card feeding mechanism for feeding successive cards past said element for sensing thereby, each card being provided with a plurality of decks in which separate data is recorded, and which decks pass the sensing element in succession, printing mechanism controlled by said sensing element in accordance with data sensed, means for effecting an operation of said printing mechanism for each cycle of operation of the machine, said printing mechanism operation including a printing portion and a restoring portion, means for normally operating said feeding mechanism to cause the first, third, fifth and successive odd ordered decks to pass said sensing element for sensing thereby during the printing portion of successive cycles of operation of said printing mechanism and the second, fourth, sixth and successive even ordered decks to pass said sensing element during the restoring portion of successive cycles, means for operating said feeding mechanism to cause all the decks to pass the sensing element for sensing thereby only during the printing portion of successive cycles of operation whereby the decks will be sensed in successive order, and means for rendering either of said operating means effective.

6. In a cyclically operable machine of the class described, a card sensing element, card feeding mechanism for feeding successive cards past said element for sensing thereby, each card being provided with a pair of decks in which separate data is recorded, and which decks pass the sensing element in succession, printing mechanism controlled by said sensing element in accordance with data sensed, means for effecting an operation of said printing mechanism for each cycle of operation of the machine, said printing mechanism operation including a printing portion and a restoring portion, means for normally operating said feeding mechanism to cause the leading decks of said cards to pass said sensing element for sensing thereby during the printing portion of successive cycles of operation of said printing mechanism and the trailing decks of said cards to pass said sensing element during the restoring portion of successive cycles, means for operating said feeding mechanism to cause all the decks to pass the sensing element for sensing thereby only during the printing portion of successive cycles of operation whereby the decks will be sensed in successive order, and means for rendering either of said operating means effective.

GEORGE F. DALY.
CLAIR D. LAKE.

REFERENCES CITED

The following references are of record in the file of this patent:

UNITED STATES PATENTS

| Number | Name | Date |
|---|---|---|
| 1,750,191 | Peirce | Mar. 11, 1930 |
| 1,818,473 | Goldberg | Aug. 11, 1931 |
| 1,864,051 | Paris | June 21, 1932 |
| 1,933,331 | Lake | Oct. 31, 1933 |
| 2,036,024 | Daly | Mar. 31, 1936 |
| 2,181,998 | Mills | Dec. 5, 1939 |
| 2,189,046 | Smith et. al. | Feb. 6, 1940 |
| 2,199,561 | Fuller et. al. | May 7, 1940 |
| 2,240,667 | Paris | May 6, 1941 |